United States Patent
Luke et al.

(10) Patent No.: US 7,590,190 B2
(45) Date of Patent: Sep. 15, 2009

(54) SYSTEM AND METHOD FOR FORWARD PATH GAIN CONTROL IN A DIGITAL PREDISTORTION LINEARIZED TRANSMITTER

(75) Inventors: Christian G. Luke, Bedminster (GB);
Ian Johnson, Horfield (GB); Mark Cope, Bath (GB); Adrian Mansell, Nailsea (GB); Steven Andrew Wood, Hotwells (GB)

(73) Assignee: Powerwave Technologies, Inc., Santa Ana, CA (US)

( * ) Notice: Subject to any disclaimer, the term of this patent is extended or adjusted under 35 U.S.C. 154(b) by 534 days.

(21) Appl. No.: 11/214,191

(22) Filed: Aug. 29, 2005

(65) Prior Publication Data

US 2006/0098758 A1   May 11, 2006

Related U.S. Application Data

(60) Provisional application No. 60/626,755, filed on Nov. 10, 2004.

(51) Int. Cl.
*H04K 1/02* (2006.01)
(52) U.S. Cl. .................. 375/297; 375/295; 375/146; 375/296; 375/232; 455/126; 455/63.1; 455/114.3
(58) Field of Classification Search .................. 375/297, 375/296, 295, 232; 455/522, 126, 114.3, 455/63.1; 330/149
See application file for complete search history.

(56) References Cited

U.S. PATENT DOCUMENTS

| | | | |
|---|---|---|---|
| 5,732,333 A * | 3/1998 | Cox et al. | 455/126 |
| 6,112,062 A * | 8/2000 | Hans et al. | 455/114.3 |
| 6,194,964 B1 | 2/2001 | Jun | |
| 7,110,469 B2 * | 9/2006 | Shi et al. | 375/295 |
| 2001/0004223 A1 | 6/2001 | Kim | |
| 2002/0050372 A1 | 5/2002 | Lee | |
| 2004/0219944 A1 | 11/2004 | Barak et al. | |
| 2005/0068102 A1 * | 3/2005 | Hongo et al. | 330/149 |
| 2005/0180527 A1 | 8/2005 | Suzuki et al. | |

OTHER PUBLICATIONS

PCT Search Report and Written Opinion dated Oct. 2, 2006.

* cited by examiner

*Primary Examiner*—Chieh M. Fan
*Assistant Examiner*—Eva Puente
(74) *Attorney, Agent, or Firm*—Myers Andras Sherman LLP

(57) ABSTRACT

A system and method for controlling the gain in the forward signal path of a digital predistortion linearizer is disclosed. The loop gain of the predistortion system is driven to unity, where a separately controlled constant-gain observation path allows accurate gain control of the forward path. This is divided into digital gain from the predistortion function and analog gain from a Voltage Variable Attenuator (VVA) in the transmitter. The invention balances the distribution between these two domains in order to maximize dynamic range and minimize noise in the forward signal path. In order to distribute the forward path gain accurately, the characteristic of the VVA must be well known. Since these devices tend to be non-linear, with variable characteristic over temperature and batch, the invention compensates for this non-linear behavior by tracking the varying transfer characteristic of the VVA, giving a predictable local characteristic. Another aspect of the disclosed invention is the ability to operate with very low transmit power and loop gain levels, allowing accurate gain control during such scenarios as cell initialization, that require operation over a wide dynamic range.

10 Claims, 3 Drawing Sheets

SYSTEM AND METHOD FOR FORWARD PATH GAIN CONTROL IN A DIGITAL PREDISTORTION LINEARIZED TRANSMITTER

RELATED APPLICATION INFORMATION

The present application claims priority under 35 USC Section 119(e) to provisional application Ser. No. 60/626,755 filed Nov. 10, 2004, the disclosure of which is incorporated herein by reference in its entirety.

FIELD OF THE INVENTION

The present invention relates to the field of digital communication. More specifically the present invention relates to the field of radio transmitters incorporating digital predistortion linearization.

BACKGROUND OF THE INVENTION

Efficiency is an important metric of high power amplifiers. In order to achieve maximum efficiency these amplifiers are often biased into strongly non-linear modes of operation. Modern high capacity modulation techniques exhibit large amplitude variation, which result in large distortion components on the output signal, leaking energy into neighboring frequency bands.

Predistortion techniques attempt to compensate for the power amplifier non-linearity by applying an inverse characteristic to the input signal. These techniques are very sensitive to the system gain, the variation of which can effectively un-calibrate the predistortion signal (the compensation applied to the signal reaching the non-linear component is either too large or too small) and degrade linearization performance.

Gain fluctuation with temperature, age, etc, is a well known phenomena associated with amplifiers and radio transceivers. AGC (Automatic Gain Control) loops have been widely used in radio systems for many years, ensuring optimum dynamic range, linearity and noise performance. The majority of these are circuit-based first- or second-order control loops, which are well understood in general control theory. Nonetheless the gain adjustment circuits in the AGC loops may themselves introduce undesired nonlinearity.

Therefore a need exists for an improved system and method for compensating for gain variations in the forward signal path of a transmitter employing a high power amplifier, which gain variations degrade linearization performance.

SUMMARY OF THE INVENTION

In a first aspect the present invention provides a method for adaptively controlling the gain of an RF transmitter including a digital predistorter, an analog gain adjuster and a high power amplifier. The method comprises receiving a digital input signal and providing a digital gain adjustment to the input signal using the predistorter to correct gain drift within a predetermined gain drift range. The method further comprises converting the input signal to an analog RF signal and providing an analog gain adjustment to the RF input signal using the analog gain adjuster when the gain drift exceeds the gain drift range.

In a preferred embodiment the method further comprises disabling and resetting the digital gain adjustment during the analog gain adjustment. The gain drift is preferably measured at a specified input signal value. For example, the specified input signal value may be a root mean square average of the input signal magnitude. The method further comprises sampling the output of the high power amplifier, digitizing the sampled output and using the digitized output to adaptively control the digital gain adjustment and the analog gain adjustment. The gain control method may preferably be initialized by disabling the digital gain adjustment, setting the analog gain adjustment at an initial setting, measuring gain error using the digital input signal and digitized output signal, adaptively controlling the analog gain adjustment until the gain error is within a tolerance value, locking the analog gain adjustment and then enabling the digital gain adjustment. The analog gain adjuster may be a voltage variable attenuator.

According to another aspect the present invention provides a method for adaptively controlling the gain of an RF transmitter employing an analog gain adjuster having a nonlinear characteristic. The method comprises receiving an input signal, sampling an output of the transmitter, and digitizing the sampled output. The method further comprises estimating a local gradient of the nonlinear characteristic of the analog gain adjuster and adaptively controlling the setting of the analog gain adjuster using the input signal, digitized output signal and estimated gradient.

In a preferred embodiment of the method, the local gradient is estimated by iteratively comparing actual gain adjustments to gain adjustment settings. The gain adjuster settings are preferably restricted to a relatively linear portion of the analog gain adjuster characteristic. For example, the gain adjuster settings are preferably restricted to a region of the characteristic where the gradient is within a predetermined limit. Also, the step size of the change in gain adjuster setting is preferably restricted to be within a predetermined limit. The analog gain adjuster may be a voltage variable attenuator. The gain adjuster settings are then digital control voltage values and the method further comprises converting the digital control voltage values to analog control voltages.

According to another aspect the present invention provides a predistortion linearized transmitter. The transmitter comprises an input for receiving a digital input signal and a predistorter receiving the digital input signal and operating on the input signal with a predistortion operation including a digital gain adjustment. The transmitter further comprises a conversion and frequency translation circuit block for converting the predistorted input signal to a higher frequency analog signal and an analog gain adjuster receiving and gain adjusting the analog signal. An amplifier receives and amplifies the gain adjusted analog signal and provides an amplified output signal. An output sampling coupler is coupled to the amplifier output and provides an analog sampled output. A frequency translation and digitization circuit block provides a digital sampled output signal from the analog sampled output signal and an adaptation circuit block is coupled to receive the digital input signal and the digital sampled output signal. The adaptation circuit block is also coupled to the predistorter and the analog gain adjuster and the adaptation circuit block adaptively controls the gain adjustments of the predistorter and analog gain adjuster based on a gain error determined from the digital input signal and sampled output signal.

In a preferred embodiment of the predistortion linearized transmitter the predistortion operation implemented by the predistorter is a digital complex gain operation. The analog gain adjuster is preferably a voltage variable attenuator. The adaptation circuit block preferably disables the digital gain adjustment operation of the predistorter during analog gain adjustment. Also, the adaptation circuit block may disable adaptation of the digital gain adjustment when the input signal power drops below a predistortion update threshold. The adaptation circuit block preferably offsets the entire predistortion gain adjustment by an accumulated inverse gain when the input signal power drops below the predistortion update threshold before providing the adaptive analog gain control. In one embodiment the adaptation circuit block calculates the gain error from a comparison of the on-time auto-correlation of the input signal and the cross-correlation of the input signal with the digital sampled output signal.

DETAILED DESCRIPTION OF THE INVENTION

Figure 1:
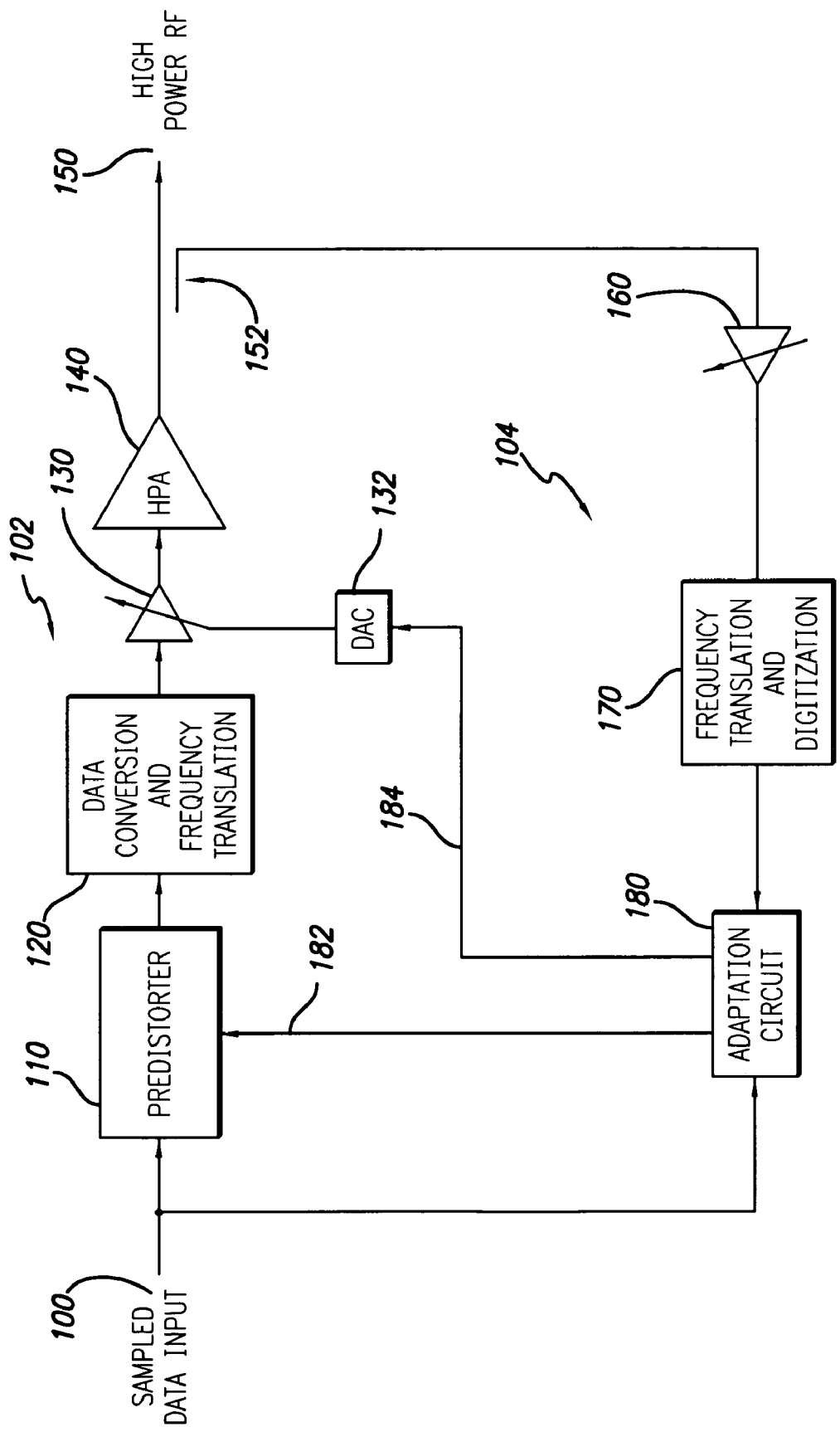
FIG. 1 is a block schematic drawing of a digital predistortion linearized transmitter in accordance with a preferred embodiment of the present invention.

FIG. 1 shows a digital predistortion linearized transmitter in accordance with a preferred embodiment of the present invention. The transmitter includes a forward signal path 102 and an observation signal path 104. The forward signal path includes a sampled data input 100 which receives a conventional digital communication signal such as a wideband CDMA or other well known digitally modulated signal. As well known to those skilled in the art, in general the input signal may be a complex digital signal provided in quadrature (I,Q) format and single lines are shown in the figures simply for ease of illustration. The input signal is modified by the predistorter 110 to compensate for the non-linear characteristic of the high power amplifier (HPA) 140. The predistorted signal is then converted to an RF signal by a conventional data conversion and frequency translation function block 120. The forward path analog gain is controlled by an RF variable voltage attenuator (VVA) 130, which is modified to maintain a constant output power. The output 150 of the HPA 140 is coupled to observation path 104 by an RF sampling coupler 152 and is also provded to conventional transmission circuitry and a suitable antenna for the particular application (not shown). The observation path signal level is controlled by another VVA 160. The analog observation path signal is converted to a digital baseband signal by a conventional frequency translation and digitization function block 170. The digital baseband signal is provided to adaptation circuit block 180 which also receives the digital input signal. The adaptation circuit block 180 employs the digital observation path signal and digital input signal to adaptively control predistorter 110 in the forward path as illustrated by line 182. The adaptation circuit block 180 also adaptively controls the analog VVA 130 in the forward path as illustrated by line 184 and an associated conventional Digital to Analog Converter (132) which converts the digital control signal to an analog voltage.

The present invention improves on existing gain control techniques by employing the adaptation of the predistorter function to perform the gain control directly, balancing the gain distribution between the predistorter function and the analog VVA 130 under the control of adaptation circuit block 180. In a preferred embodiment, a small window is specified over which the magnitude of the predistorter function can vary. When the magnitude exceeds a set threshold, the predistorter function is reset and the gain control is applied, instead, to the analog VVA 130 in the forward signal path. This maintains optimal dynamic range in the baseband signal processing.

The present invention also provides improved control over the VVA. The VVA characteristic tends to be non-linear over its range. Previous techniques to compensate for this have involved the use of polynomial models to predict the required gain change. However, this characteristic varies over temperature and batch, causing potentially large errors in this approach, or—in a worst case—gain oscillations. The present invention addresses this problem by approximating the characteristic of the VVA as a straight line, which is a good approximation of the local characteristic of interest. The gradient of this line is modified as the change in gain deviates from the local characteristic prediction, thereby allowing the gain control algorithm to track the characteristic of the VVA over its full operating range.

Figure 2:
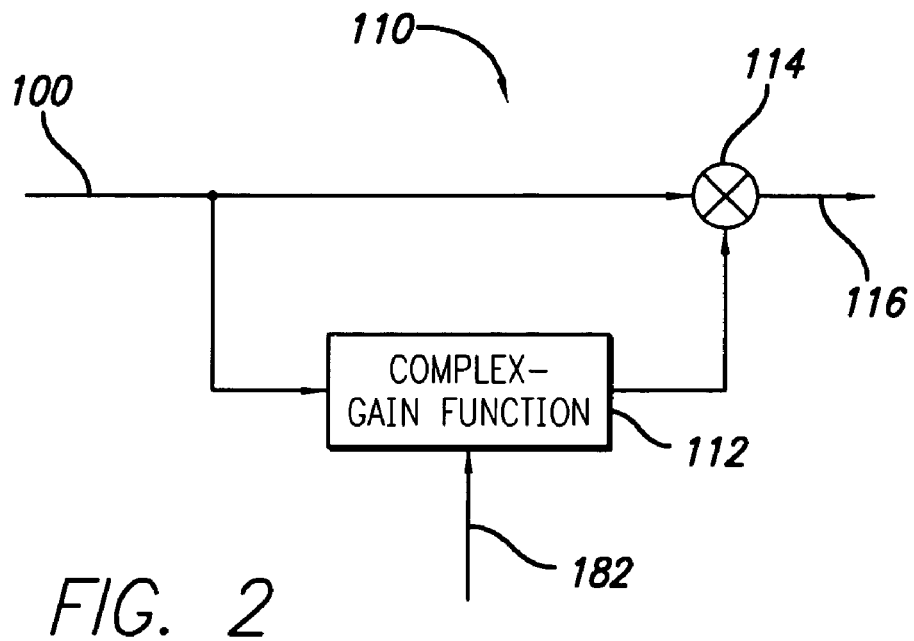
FIG. 2 is a block schematic drawing of the digital predistorter shown in FIG. 1 in accordance with a preferred embodiment of the present invention.

In the preferred embodiment of the predistorter 110, the predistortion function is a multiplicative complex-gain function as shown in FIG. 2. The input signal is provided to complex gain function block 112 which provides a complex gain value from the input signal, for example using the input signal magnitude. Any of a variety of known techniques, for example a Look Up Table or polynomial based approach, may be employed to provide the gain function from the input signal. The complex gain value is then applied to the input signal at multiplier 114 to provide a predistorted input signal along line 116. The adaptation engine 180 updates this complex gain function with the inverse gain measured by dividing the sampled data input 100 with the digitized observation path signal. This gain function is, therefore, not only driven to compensate for the non-linear behaviour of the HPA, but also to maintain unity loop gain.

The forward path gain is effectively controlled by the observation path gain, which is assumed fixed. As the observation path has a fixed gain, any non-zero loop gain will be accumulated, causing a magnitude offset in the updated predistortion function. The predistortion function is therefore driven to maintain a constant output power from the HPA. This method alone is not sufficient to perform gain control over the full dynamic range of the transmit signal, as the quantization noise introduced by the digital predistortion function and the dynamic range of the DACs will limit performance. Instead, a maximum drift range is applied to the magnitude of the predistortion complex-gain function. When the monitored drift exceeds this range the predistortion function magnitude offset is removed as described in equation (1), and the forward-path analog gain adjusted to compensate.

$$P(x) = \frac{P(x)}{\text{Gain\_drift}} \qquad (1)$$

VVA_gain = VVA_gain * Gain_drift

The benefit of this technique is that the forward path gain can be controlled very accurately by the adaptation of the predistortion function. As there is a finite time delay between adjusting the predistortion function magnitude offset and the analog gain, the transmit gain can be momentarily in error. The predistortion function drift range should be set low enough to minimize the effect of these gain transients, but high enough to allow it to adjust for any error in evaluating the analog gain setting.

Figure 3:
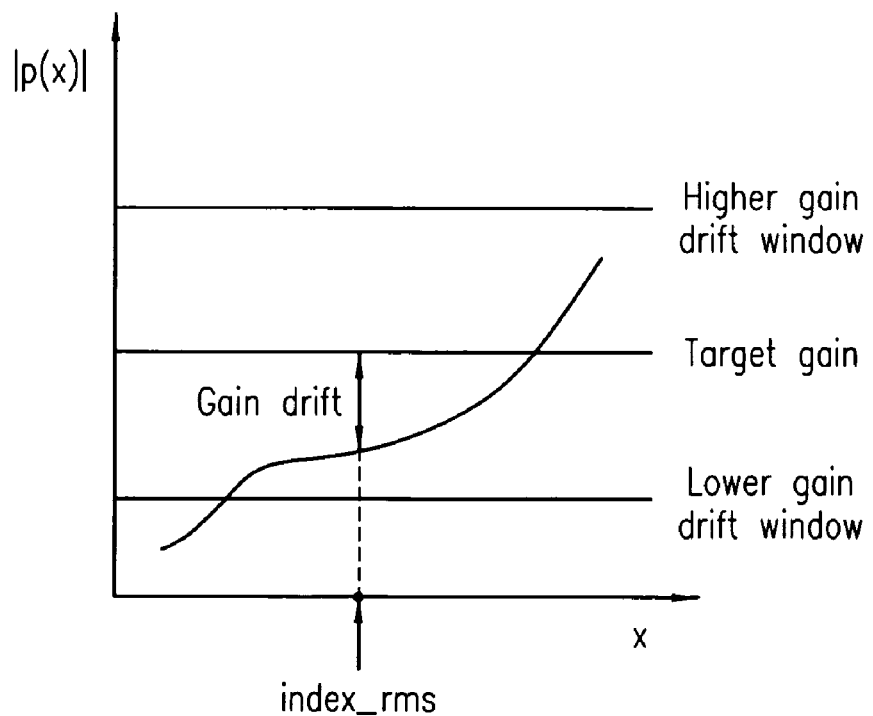
FIG. 3 is a graphical representation of the gain drift of the predistortion function from the RMS target value illustrating the window of predistorter gain operation in accordance with a preferred embodiment of the present invention.

As the predistortion function is non-linear, a suitable index value must be chosen to drive the gain drift threshold decision. The actual value of the gain control index is not crucial, as once the loop has converged, the inverse gain should be 1 for all magnitudes of the input signal. In the preferred embodiment, the index value corresponding to the RMS of the sampled data input magnitude is used, which allows for easier control over digital scaling and gain budgeting. The gain of the predistortion function at the RMS index is maintained to a preset "target" value plus or minus the preset gain drift range. This is illustrated in FIG. 3.

Under normal operating conditions the predistortion function is being actively adapted and the gain control algorithm is locked. In this situation the gain drift can be measured directly from the predistortion function at the RMS index, as shown in FIG. 3. In a preferred embodiment, the present invention employs two additional methods for calculating the gain drift of the predistortion function from its target value, which are used to provide gain control while the predistortion function adaptation is disabled, or when the gain control algorithm is unlocked or initialized.

Many digital predistortion functions only need to operate over a finite input power range, due to increasing linearity and less aggressive spectral requirements at lower powers. Once the input power drops below the predistortion update threshold, the predistortion function is no longer adapted and cannot be used to determine the gain drift to drive the gain control algorithm. The gain control algorithm could resort to operating on the accumulated gain error from the adaptation engine 180, correcting the analog gain when this error exceeds the gain drift window, but this would result in a potential gain error equivalent to the window size. The gain control algorithm solves this by offsetting the entire predistortion function by the accumulated inverse gain prior to evaluating the gain drift. The gain error is evaluated from the accumulated inverse gain corresponding to the RMS index. This is treated as a linear gain change and applied as a scalar to the predistortion function.

The inverse gain method described above is valid in high signal-to-noise conditions. As it derives the gain control error from a narrow range of input signal powers, it can degrade in noisy conditions. Another method that is useful in extending the gain control algorithm over large dynamic ranges involves correlation, which is much more robust in low signal-to-noise conditions. Exploiting time alignment in the adaptation engine 180, the gain error is calculated from a comparison of the "on-time" auto-correlation of the input signal, and the cross-correlation of the input signal with the observation path signal. This is shown in equation (2).

$$\begin{aligned} \text{auto\_corr} &= S\_\text{in}(t) * S\_\text{in}(t)^H \\ \text{cross\_corr} &= S\_\text{in}(t) * S\_\text{obs}(t)^H \\ \text{Gain\_error} &= \frac{\text{auto\_corr}}{|\text{cross\_corr}|} \end{aligned} \quad (2)$$

Next the VVA gain control is explained in more detail with reference to FIGS. 1 and 4-5. As described above, once the magnitude of the predistortion function at the RMS index exceeds the specified range, the function is reset to the target gain and the gain drift applied to the VVA. Also as noted above the VVA will typically have a nonlinear characteristic making precise gain control difficult. The application of the gain control to the VVA is controlled in a manner to address this problem.

The analog gain adjust is achieved by digitally controlled Voltage Variable Attenuator (VVA) 130 in the forward-path, where the control voltage is set from the adaptation engine via Digital to Analog Converter (DAC) 132. A gradient search method is preferably used to estimate the VVA characteristic over a small range of VVA values. As the forward-path gain changes, the gradient is adjusted to track the characteristic of the VVA 130. This enables the gain control to function over a wide range of VVA characteristics and temperatures.

Figure 4:
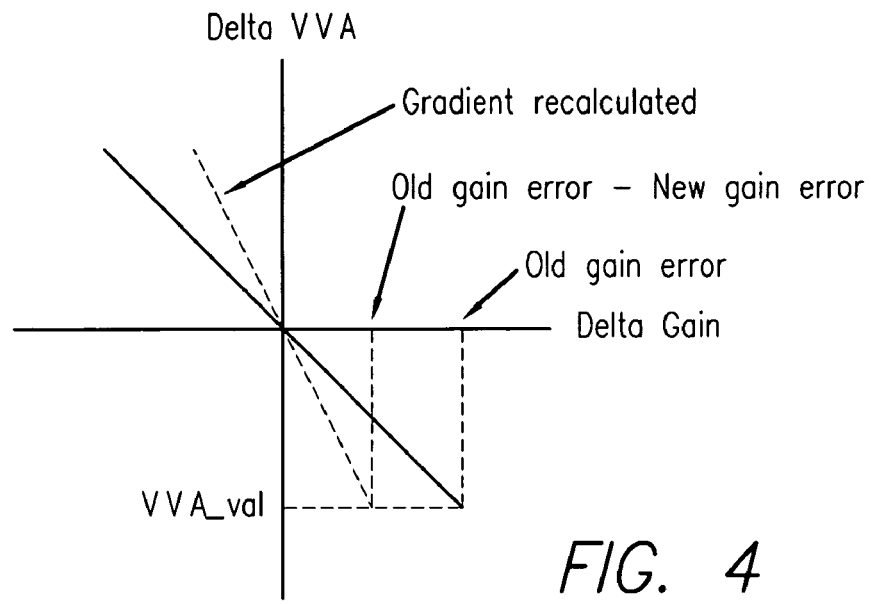
FIG. 4 is a graphical representation illustrating adaptation of the VVA gradient in accordance with a preferred embodiment of the present invention.
Figure 5:
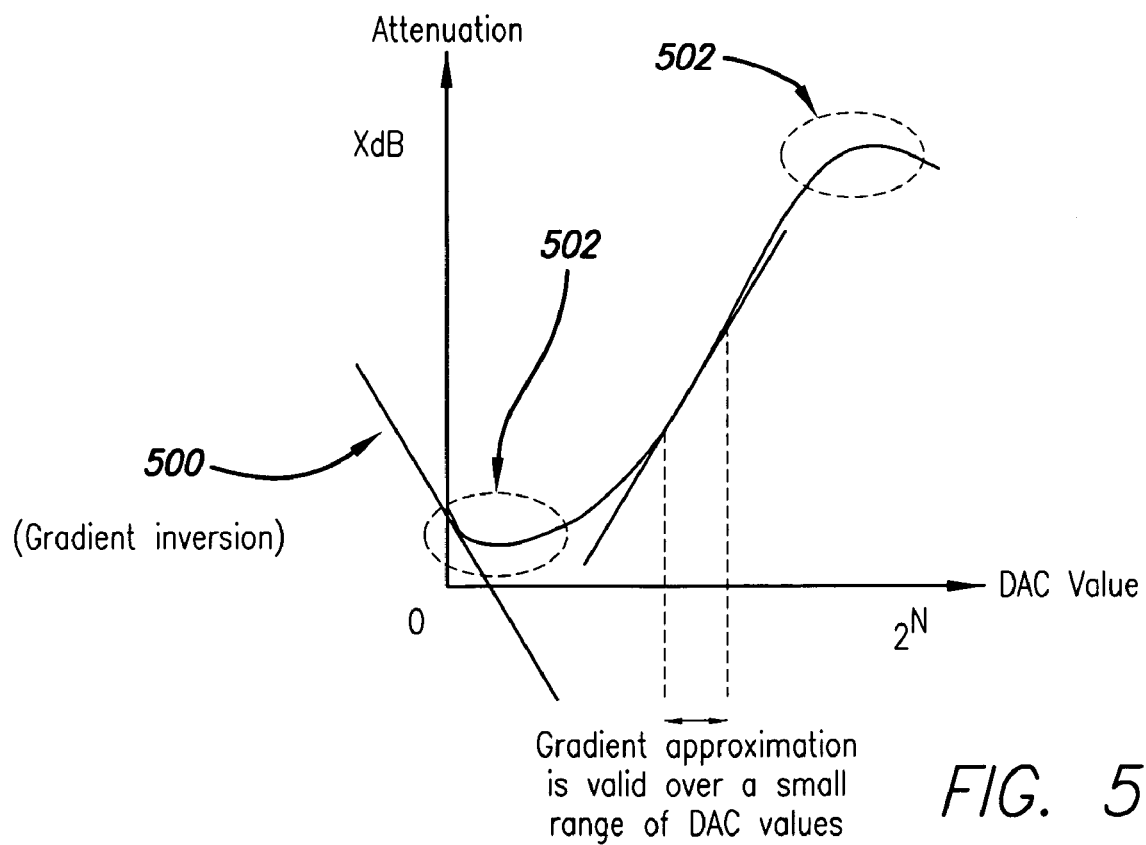
FIG. 5 is a graphical representation illustrating the nonlinearity of the VVA characteristic addressed by the present invention.

FIG. 4 illustrates how the gradient is modified. The local characteristic of the VVA is modeled by a change in gain versus a change in the DAC value that sets the control voltage of the VVA. The drift from the target gain of the predistortion function is the change in gain, from which the required change in VVA control setting is calculated. On the subsequent iteration, the actual change in gain corresponding to the change in DAC value can be calculated as the difference between the old gain error and the new gain error. For example, if a 3 dB gain change was required, but the subsequent gain error was 1 dB, then the VVA change has only resulted in 2 dB of gain change. From this the gradient can be modified.

The VVA gain-change-per-step reduces at the edges of its range, so the gradient of the characteristic shown in FIG. 4 will increase, potentially to infinity. There is also the potential for the response to have inflections, which could result in a gradient inversion (as shown at 500 in FIG. 5). This characteristic is also subject to variation over batch and temperature, which further complicates a generic gain control algorithm. Inflections in the VVA characteristic are particularly challenging, as these cause gradient inversions from which the algorithm could not recover without additional checks. To address this problem a gradient limit is set to prevent the use of the VVA at the ends of its range (regions 502 in FIG. 5). Should the gradient exceed a preset value, an out of range alarm is reported to the system. The VVA value is maintained at this level while the gain control attempts to exceed it, otherwise returning to normal operation. The out of range alarm is also reported should the DAC value reach the absolute ends of its range.

In a preferred embodiment, the VVA control algorithm initializes as unlocked, with the VVA setting at maximum attenuation. In this mode, the predistortion function adaptation remains inactive while the analog gain is adjusted to bring the gain error within tolerance. When within tolerance, the VVA gain control is set locked and the predistortion function adaptation enabled. The gradient approximation is only valid over a small range of DAC values, so in order to prevent the output power overshooting its maximum limit some restriction is required on the maximum gain change. The maximum gain step cannot reliably be limited to a preset value, as it is essentially the "unknown" in this adaptation method. Instead, a maximum DAC step is applied. However, observing the linear region of the VVA characteristic and choosing an appropriate DAC step can determine an approximate gain step limit.

An additional precaution protects from potential gradient inversion during the gain ramping. The inflection at the high attenuation end of certain VVA responses varies wildly over temperature. In most cases, the maximum DAC step is large enough to ensure that the first step moves sufficiently beyond the inflection point so as not to adversely affect the gradient calculation. If the step does not overcome the inflection point, a gradient inversion will occur. When a gradient inversion is detected, the VVA is not adjusted accordingly, but forced to continue in the same direction. Once the inversion is clear, the gradient will be adjusted correctly.

This gain control technique relies on the assumption that the gain characteristic of the VVA is linear over a small range of DAC values, giving a stable gain control algorithm for slow variations in gain. Should the measured gain error exceed a preset value, the algorithm is set unlocked before disabling the predistortion function adaptation. The algorithm continues to operate in unlocked mode until the gain error comes within the tolerance window of the predistortion function gain.

Any adjustment to the calculated DAC value change (exceeding maximum step size, etc) should be taken into account on the subsequent iteration to ensure correct gradient calculation. The predistortion function gain change should be adjusted accordingly to maintain correct gain calibration in the forward path. However, the original gain error must be used in the subsequent iteration gradient calculation.

In a view of the above it will be appreciated that the present invention provides an improved forward path gain control system and method for predistortion linearized transmitters. Although specific detailed embodiments have been described these should not be viewed as limiting in nature as a variety of modifications may be provided employing the teachings of the present invention, as will be appreciated by those skilled in the art.

What is claimed is:

1. A method for adaptively controlling the gain of an RF transmitter including a digital predistorter, an analog gain adjuster and a high power amplifier, the method comprising:
   in the RF transmitter:
      receiving a digital input signal;
      providing a digital gain adjustment to said input signal using said predistorter to correct gain drift within a predetermined gain drift range;
      converting said input signal to an analog RF signal;
      providing an analog gain adjustment to said RF signal using said analog gain adjuster when gain drift exceeds said gain drift range; and
      disabling and resetting the digital gain adjustment during said analog gain adjustment.

2. A method for adaptively controlling the gain of an RF transmitter including a digital predistorter, an analog gain adjuster and a high power amplifier, the method comprising:
   in the RF transmitter:
      receiving a digital input signal;
      providing a digital gain adjustment to said input signal using said predistorter to correct gain drift within a predetermined gain drift range;
      converting said input signal to an analog RF signal; and
      providing an analog gain adjustment to said RF signal using said analog gain adjuster when gain drift exceeds said gain drift range;
   wherein said gain drift is measured at a specified input signal value; and
   wherein said specified input signal value is a root mean square average of the input signal magnitude.

3. A method for adaptively controlling the gain of an RF transmitter including a digital predistorter, an analog gain adjuster and a high power amplifier, the method comprising:
   in the RF transmitter:
      receiving a digital input signal;
      providing a digital gain adjustment to said input signal using said predistorter to correct gain drift within a predetermined gain drift range;
      converting said input signal to an analog RF signal;
      providing an analog gain adjustment to said RF signal using said analog gain adjuster when gain drift exceeds said gain drift range;
      sampling the output of the high power amplifier, digitizing the sampled output and using the digitized output to adaptively control said digital gain adjustment and said analog gain adjustment; and
      initializing the gain control by:
         disabling said digital gain adjustment;
         setting the analog gain adjustment at an initial setting;
         measuring gain error using the digital input signal and digitized output signal;
         adaptively controlling the analog gain adjustment until the gain error is within a tolerance value;
         locking the analog gain adjustment; and
         enabling said digital gain adjustment.

4. The method for adaptively controlling the gain of an RF transmitter as set out in claim 1, wherein said analog gain adjuster is a voltage variable attenuator.

5. A predistortion linearized transmitter, comprising:
   an input for receiving a digital input signal;
   a predistorter receiving the digital input signal and operating on the input signal with a predistortion operation including a digital gain adjustment;
   a conversion and frequency translation circuit block for converting the predistorted input signal to a higher frequency analog signal;
   an analog gain adjuster receiving and gain adjusting the analog signal;
   an amplifier receiving and amplifying the gain adjusted analog signal and providing an amplified output signal;
   an output sampling coupler coupled to the amplifier output and providing an analog sampled output from the amplified output signal;
   a frequency translation and digitization circuit block providing a digital sampled output signal from said analog sampled output signal; and
   an adaptation circuit block, coupled to receive said digital input signal and said digital sampled output signal and coupled to said predistorter and said analog gain adjuster, said adaptation circuit block adaptively controlling the gain adjustments of said predistorter and analog gain adjuster based on a gain error determined from the digital input signal and sampled output signal;
   wherein said adaptation circuit block disables the digital gain adjustment operation of the predistorter during analog gain adjustment.

6. The predistortion linearized transmitter as set out in claim 5, wherein said predistortion operation is a digital complex gain operation.

7. The predistortion linearized transmitter as set out in claim 5, wherein said analog gain adjuster is a voltage variable attenuator.

8. A predistortion linearized transmitter, comprising:
   an input for receiving a digital input signal;
   a predistorter receiving the digital input signal and operating on the input signal with a predistortion operation including a digital gain adjustment;
   a conversion and frequency translation circuit block for converting the predistorted input signal to a higher frequency analog signal;
   an analog gain adjuster receiving and gain adjusting the analog signal;
   an amplifier receiving and amplifying the gain adjusted analog signal and providing an amplified output signal;

an output sampling coupler coupled to the amplifier output and providing an analog sampled output from the amplified output signal;

a frequency translation and digitization circuit block providing a digital sampled output signal from said analog sampled output signal; and an adaptation circuit block, coupled to receive said digital input signal and said digital sampled output signal and coupled to said predistorter and said analog gain adjuster, said adaptation circuit block adaptively controlling the gain adjustments of said predistorter and analog gain adjuster based on a gain error determined from the digital input signal and sampled output signal;

wherein said adaptation circuit block disables adaptation of the digital gain adjustment when the input signal power drops below a predistortion update threshold.

9. A predistortion linearized transmitter, comprising:

an input for receiving a digital input signal;

a predistorter receiving the digital input signal and operating on the input signal with a predistortion operation including a digital gain adjustment;

a conversion and frequency translation circuit block for converting the predistorted input signal to a higher frequency analog signal;

an analog gain adjuster receiving and gain adjusting the analog signal;

an amplifier receiving and amplifying the gain adjusted analog signal and providing an amplified output signal;

an output sampling coupler coupled to the amplifier output and providing an analog sampled output from the amplified output signal;

a frequency translation and digitization circuit block providing a digital sampled output signal from said analog sampled output signal; and an adaptation circuit block, coupled to receive said digital input signal and said digital sampled output signal and coupled to said predistorter and said analog gain adjuster, said adaptation circuit block adaptively controlling the gain adjustments of said predistorter and analog gain adjuster based on a gain error determined from the digital input signal and sampled output signal;

wherein said adaptation circuit block offsets the entire predistortion gain adjustment by an accumulated inverse gain when the input signal power drops below a predistortion update threshold before providing said adaptive analog gain control.

10. A predistortion linearized transmitter comprising:

an input for receiving a digital input signal;

a predistorter receiving the digital input signal and operating on the input signal with a predistortion operation including a digital gain adjustment;

a conversion and frequency translation circuit block for converting the predistorted input signal to a higher frequency analog signal;

an analog gain adjuster receiving and gain adjusting the analog signal;

an amplifier receiving and amplifying the gain adjusted analog signal and providing an amplified output signal;

an output sampling coupler coupled to the amplifier output and providing an analog sampled output from the amplified output signal;

a frequency translation and digitization circuit block providing a digital sampled output signal from said analog sampled output signal; and an adaptation circuit block, coupled to receive said digital input signal and said digital sampled output signal and coupled to said predistorter and said analog gain adjuster, said adaptation circuit block adaptively controlling the gain adjustments of said predistorter and analog gain adjuster based on a gain error determined from the digital input signal and sampled output signal;

wherein said adaptation circuit block calculates the gain error from a comparison of the on-time auto-correlation of the input signal and the cross-correlation of the input signal with the digital sampled output signal.

* * * * *